June 5, 1934.  E. R. T. JONES  1,961,224
MACHINE FOR MAKING WELDED TUBING
Original Filed June 8, 1929  2 Sheets-Sheet 1
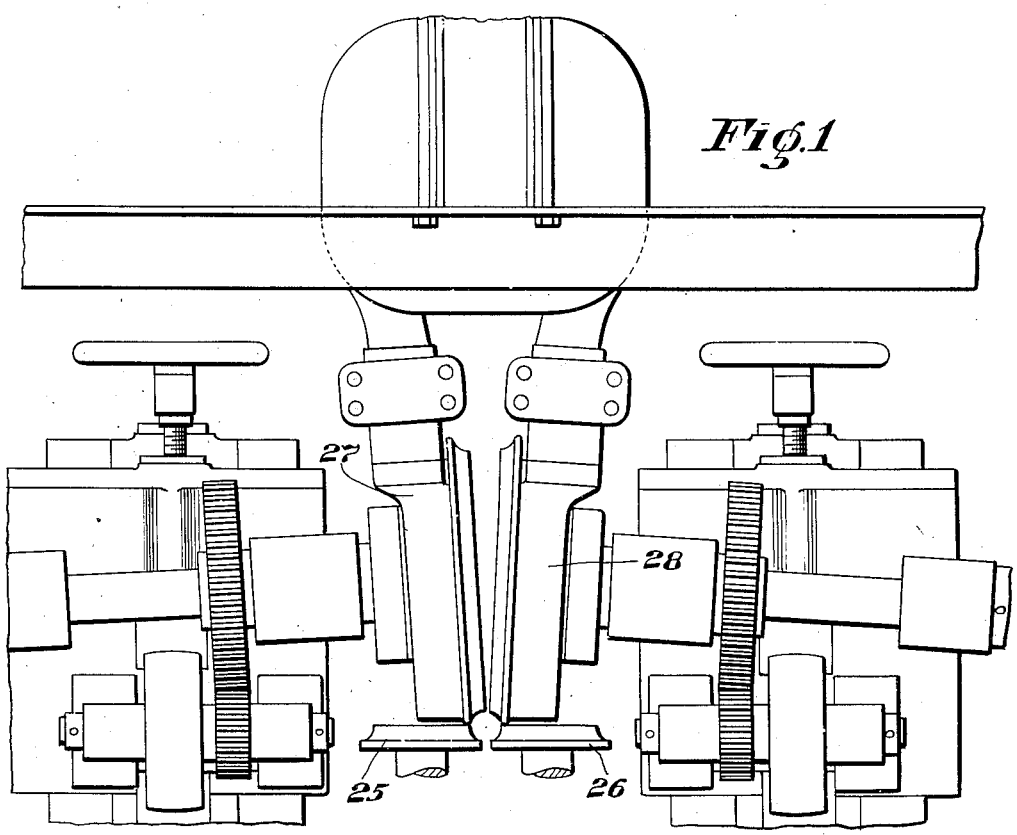
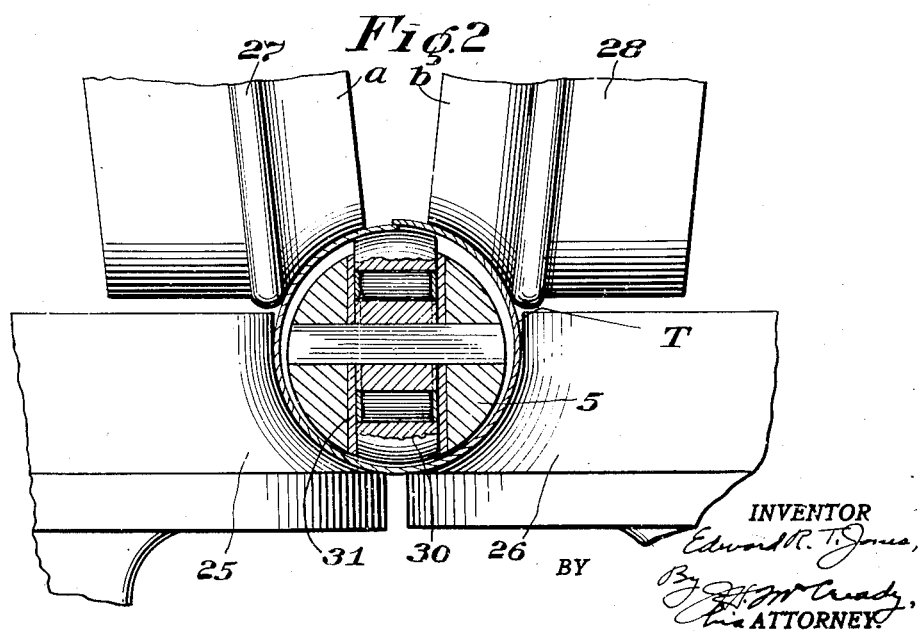
INVENTOR
Edward R. T. Jones,
BY
ATTORNEY

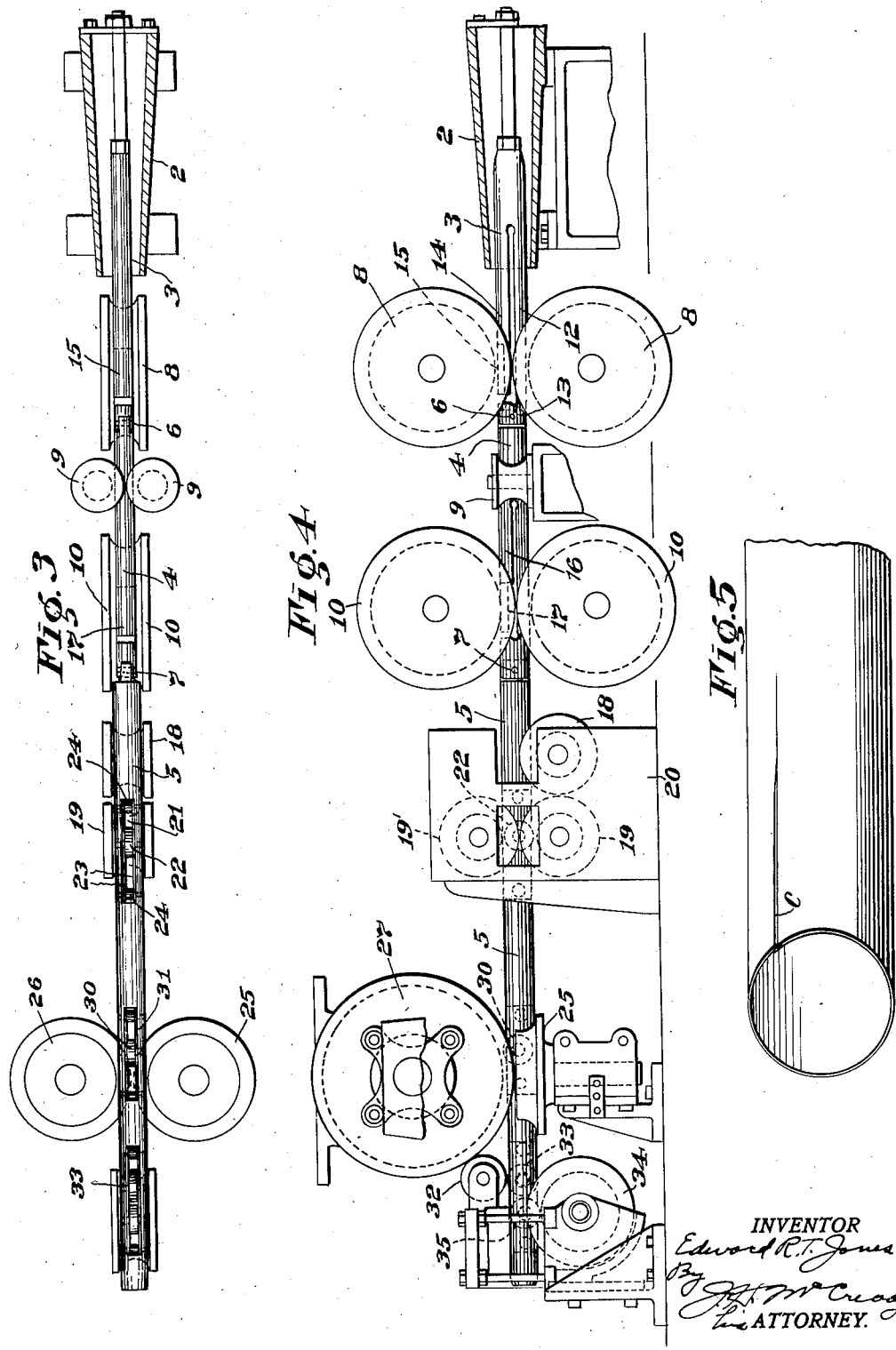

Patented June 5, 1934

1,961,224

UNITED STATES PATENT OFFICE 1,961,224

MACHINE FOR MAKING WELDED TUBING

Edward R. T. Jones, Brooklyn, N. Y., assignor to S. Jackson Tube Co. Inc., Brooklyn, N. Y., a corporation of New York Application June 8, 1929, Serial No. 369,343
Renewed April 21, 1934

5 Claims. (Cl. 219—6)

The present invention relates to the manufacture of metal tubing by rolling a narrow continuous strip or ribbon of sheet metal into the form of a split tube and then welding the edges of the tube together.

The main object of the invention is to produce a continuously welded tube at high speeds in which the grain of the welded metal shall be substantially as refined as that of the unheated metal of the tube, and which also will have a smooth exterior surface. The invention involves a combination of electric lap-welding and forging and a novel machine for performing these operations.

Prior to my invention, so far as I am aware, such tubes have not been successfully produced by any process involving electric welding.

Prior processes involving butt-welding of the opposing edges of a split tube have not accomplished the result of my invention, because, when carried out at comparatively low speeds, they have resulted in a heavy burr and a coarsening of the metal grain in the seam and, when carried out at high speeds, they produce a so-called "stitch" weld which tends to become discontinuous and also has a coarsened metal grain. Butt-welding of the latter class is also disadvantageous in that it requires extreme accuracy in preparing and bringing the abutting edges together in exactly the correct mutual relationship necessary for the welding operation.

Previous methods of forming tubes by electric lapwelding have produced a tube in which the overlapping of one edge on the other has left a ridge on the surface of the tube. In such a tube the metal at the weld is coarsened as in butt-welding.

I have discovered that by carrying out the lap-welding process in a novel manner I can forge or roll the lapped and welded edges into the same plane. The result is a continuous welded tube having the desired smooth exterior, the welded metal having a grain substantially as refined as that of the rest of the tube. The process may be carried out at speeds up to one hundred or more feet a minute by suitably adjusting the tube feeding mechanism and the welding current to the required conditions and without resulting in a "stitch" weld even if an alternating electric current of sixty cycles per minute is used.

The invention will be readily understood from the following description when read in connection with the accompanying drawings, and the novel features will be particularly pointed out in the appended claims.

In the drawings,

Figure 1 is a front view showing a part of a machine organized in accordance with the present invention;

Fig. 2 is a view partly in front elevation and partly in vertical section showing the members which act on the tube at and adjacent the welding point;

Fig. 3 is a diagrammatic plan view of the "plug" of the machine and parts cooperating with it;

Fig. 4 is a side elevation of the plug and parts cooperating therewith; and

Fig. 5 is a perspective view of a portion of a tube illustrating two successive steps in the process provided by this invention.

According to the preferred method of practicing this invention, the ribbon of metal is rolled into the form of a tube and its edges brought into overlapping contact. The edges and adjacent metal are heated by an electric current and the lapped edges are welded together, producing a lap welded seam extending longitudinally of the tube. Immediately thereafter and while the metal in and adjacent the seam is still in a hot plastic condition, it is subjected to a rolling operation which so forges the metal as to bring the lapped edges into the same plane. This produces a continuous weld having a refined grain and makes a smooth exterior surface on the tube. I have found that excellent results are obtained when the tube is fed at the rate of one hundred feet a minute.

This process can be practiced with the aid of a considerable variety of machines. The particular machine shown resembles, in its general organization, the well known Thomson tube electric butt-welding machine, but differs from it in certain important particulars.

The mechanism for rolling the ribbon or strip of metal into a tubular form may be similar to that used in such prior tube making machines. The mechanism, as here shown, includes rolls which feed the strip and bend it transversely into approximately a U-shaped form and then pass it through a cone 2, Figs. 2 and 3, having such shape and dimensions that it brings the opposite edges of the strip into overlapping relationship. A "plug" extends partly or entirely through the cone 2 and the tube is formed around the plug. This plug comprises sections 3, 4 and 5 connected end to end by pivots 6 and 7. After leaving the cone 2 the tube passes between several pairs of rolls indicated at 8—8, 9—9 and 10—10, respectively, which assist in shaping the metal strip and holding it in a tubular form. The rolls 8—8 and 10—10 are arranged vertically while the other pair of rolls 9—9 are horizontally disposed.

Any tendency of the stock to wrinkle as it passes between the vertical pairs of rolls can be substantially overcome by providing a yielding portion in the plug opposite the bite of each pair of vertical rolls. For this purpose the section 3 of the plug is split horizontally, as shown at 12, and this split is joined by a transverse cut 13, thus making a more or less yielding or resilient portion 14 which is partially free from the rest of the plug. A hardened metal piece 15 is set into the part 14 opposite the bite of the rolls 8—8. This member, therefore, yieldingly supports the overlapped margins of the tube while they are acted upon by the rolls 8—8. The same construction is provided in the plug section 4, the resilient part of the plug being indicated at 16 and the hardened piece at 17. Obviously it is immaterial where the edges of the ribbon are brought into overlapping relationship as the ribbon advances toward the welding point so long as they are brought into such lapped relationship prior to being welded together.

After leaving the rolls 10—10 the split tube passes over the guide roll 18 and between upper and lower rolls 19'—19, all three of these rolls being supported in a bracket or frame 20. In order to support the plug at this point, it is slotted, as indicated at 21, Fig. 3, and a roll 22 is mounted in the slot in alinement with the upper and lower rolls 19'—19. The lower edge of the roll 22 projects slightly below the lower side of the plug 5 and it cooperates with the lower roll 19 in supporting the plug, since these rolls are separated simply by the thickness of the metal tube which is travelling forward between them toward the welding point. Hardened wear pieces or liners 23, Fig. 3, are set into the slot 21 at opposite sides of the roll 22 and are held in this position by pins extending through the plug and spacing collars 24 mounted on the pins.

The tube next comes to the "throat" of the machine where the heating and welding operation is performed. At this point the tube is supported by two grooved rolls 25 and 26, respectively. Electric current is conducted to and from the tube by the welding roller electrodes 27 and 28 having grooved faces $a$ and $b$, respectively, to cooperate with the rolls 25 and 26 in confining the tubular strip circumferentially and holding it in the desired tubular form. In Fig. 2 the portion of the tube in the throat of the machine is shown in cross-section at T. It will be seen that the grooved face $b$ of the welding roll 28 which engages the tube T is slightly higher than that of the corresponding face $a$ of the roll 27. Neither of these electrodes or welding rolls 27 or 28 contacts directly with the lapped portions of the tube, but with parts of the tube at some distance from those edges. The heating and welding current, therefore, passes from one electrode to the other, not only through the lapped surfaces but also through considerable metal at each side of the lap. All of this metal preferably is highly heated.

The lapped surfaces of the tube are not directly supported internally at the welding point but that they are so supported in front of this point by a roll 30 positioned in a slot 31 in the plug section 5. The mounting of this roll in the plug is similar to that of the roll 22, but the upper edge of the roll 30 projects above the upper side of the plug. Because of its location it always engages relatively cool parts of the tube which are travelling toward the welding point and it acts constantly through a short length of tube to hold the lapped edges up against the welding rolls 27 and 28 in the throat of the machine. At the same time the roll itself, being out of the region subjected to welding heat and in contact with relatively cool metal, does not become unduly heated.

The tube is fed forward between the electrodes at the desired speed while the welding operation takes place and forms an overlapping welded seam as shown at $c$ in Fig. 5, the tube having both internal and external shoulders somewhat less in height than the thickness of the stock.

Before the metal in and adjacent the seam has had time to cool below plasticity, the lapped and united edges are forced between rollers 32 and 33, Figs. 3 and 4, which forge the hot plastic metal into the same plane and produce a smooth exterior surface. This operation works the metal so as to consolidate it and refine its grain. The upper roll 32 is mounted on a fixed part of the machine frame as close as possible to the electrodes 27 and 28. It revolves on a stationary axis. The lower roll 33 is carried by the plug section 5. The tube is backed up or supported vertically by a third roll 34, Fig. 1, also carried by the frame, and this roll cooperates with a roll 35 in the plug to support the plug in the same manner that it is supported by the rolls 22 and 19.

There is considerable tendency for the roll 33 to stick due to the fact that it is subjected to a relatively high temperature. I have found that this difficulty can be effectually overcome by mounting the roll on roller bearings. It is preferable, also, to mount the roller 30 in the same manner, as shown in Fig. 2. In fact, all of the rolls carried by the plug can conveniently be supported on roller bearings and their friction thus reduced.

The finished tube has an approximately uniform thickness of wall and a smooth outside surface. The weld is continuous and the welded metal has a grain substantially as refined as that of the rest of the tube. The process may be carried out at speeds as high as one hundred feet per minute. So far as I know, no tube having such qualities has ever been produced before at any such speed.

Having thus described my invention, what I desire to claim as new is:

1. In a tube making machine, the combination of means for feeding a ribbon of sheet metal continuously and rolling said ribbon into the form of a split tube with one edge of the ribbon overlapped upon the other, two electrodes mounted to bear against the outer surface of said tube to cause a welding current to flow through said lapped edges, and means inside the tube for engaging the inner of said edges at a point adjacent but in advance of the welding point and supporting it for the welding operation.

2. In a tube making machine, the combination of means for feeding a ribbon of sheet metal continuously and rolling said ribbon into the form of a split tube with one edge of the ribbon overlapped upon the other, two welding electrodes mounted to bear on said tube at opposite sides of said lapped edges, a plug extending into said tube, and a roll carried by said plug and positioned to engage the inner of said lapped edges at a point adjacent but in front of the welding point and supporting said edge for the welding operation.

3. In a tube making machine, the combination of means for feeding a ribbon of sheet metal continuously and rolling said ribbon into the form of a split tube with one edge of the ribbon overlapped upon the other, two welding electrode rolls mounted to bear on said tube at opposite sides of said lapped edges, said rolls having grooved faces to conform approximately to the contour of the tube and one of said faces being higher than the other, a plug substantially enclosed by the part of the tube moving toward said rolls, and a roll carried by said plug and mounted to engage the inner of said lapped edges at a point adjacent but in front of the welding point and serving to support said edge for the welding operation.

4. In a tube making machine, the combination of means for feeding a ribbon of sheet metal continuously and rolling said ribbon into the form of a split tube with one edge of the ribbon overlapped upon the other, two electrodes mounted to bear against the outer surface of said tube to cause a welding current to flow through said lapped edges, a plug extending into said tube, and a roll carried by said plug and mounted on roller bearings and serving to support the inner of said edges adjacent the welding point.

5. In a tube making machine, the combination of means for feeding a ribbon of sheet metal continuously and rolling said ribbon into the form of a split tube with one edge of the ribbon overlapped upon the other, two electrodes mounted to bear against the outer surface of said tube to cause a welding current to flow through said lapped edges, means inside the tube for engaging the inner of said edges at a point adjacent but in advance of the welding point and supporting it for the welding operation, and means for acting on the welded portions adjacent to but behind the welding point to forge the lapped edges and thereby to reduce the thickness of the welded seam.

EDWARD R. T. JONES.